United States Patent

Kikinis et al.

[11] Patent Number: 5,565,897
[45] Date of Patent: Oct. 15, 1996

[54] INTERACTIVE SYSTEM FOR CALIBRATION OF DISPLAY MONITORS

[75] Inventors: Dan Kikinis, Saratoga; Pascal Dornier, Sunnyvale, both of Calif.

[73] Assignee: Elonex Technologies, Inc., San Mateo, Calif.

[21] Appl. No.: 307,529

[22] Filed: Sep. 16, 1994

Related U.S. Application Data

[63] Continuation-in-part of Ser. No. 181,884, Jan. 14, 1994.
[51] Int. Cl.$^6$ .................................................. G09G 1/04
[52] U.S. Cl. ........................... 345/213; 345/904; 345/13
[58] Field of Search ........................ 345/211–213, 904, 345/156–184; 348/177, 178, 180, 181, 184, 185, 189–191, 460

[56] References Cited

U.S. PATENT DOCUMENTS

| 5,214,499 | 5/1993 | Gleim et al. | 348/189 |
| 5,216,504 | 6/1993 | Webb et al. | 348/190 |
| 5,241,281 | 8/1993 | Wilkes et al. | 345/201 |
| 5,260,785 | 11/1993 | Gleim et al. | 348/180 |
| 5,266,938 | 11/1993 | Mogi et al. | 345/204 |
| 5,448,263 | 9/1995 | Martin | 345/173 |

*Primary Examiner*—Jeffery Brier
*Attorney, Agent, or Firm*—Donald R. Boys

[57] ABSTRACT

A system for adjusting signals to a CRT in a video monitor utilizes an interactive display having shapes that appear rectangular on a properly adjusted monitor and dragging handles associated with the shapes. Control routines executed on a host computer associate pointer position and movement in dragging the handles with creation of signals to be sent to the monitor to correct signals to the CRT to produce a properly sized, positioned, and shaped display. In one embodiment, digital values are placed in serial packets on a VSYNC line from the host to the video monitor, and a microcontroller in the monitor receives the digital values and drives circuitry in the monitor according to the received commands and data to adjust the signals to the CRT to correct the display.

16 Claims, 9 Drawing Sheets

INTERACTIVE SYSTEM FOR CALIBRATION OF DISPLAY MONITORS

CROSS-REFERENCE TO RELATED DOCUMENTS

The present invention is a Continuation-in Part of copending patent application Ser. No. 08/181,884, filed Jan. 14, 1994, also titled "Remote Control of Display Functions".

FIELD OF THE INVENTION

The present invention is in the area of general-purpose computer systems, and pertains more specifically to apparatus and methods for remotely controlling functions of display monitors, such as cathode ray tube (CRT) monitors.

BACKGROUND OF THE INVENTION

A display monitor is an important element of a general-purpose computer system, and accounts for a significant portion of the total cost of a system. The display monitor is the systems's principle user interface, and functions to provide information to a user in both graphic and text form.

Manufacturers of monitors are motivated to improve their products by improving characteristics such as resolution, contrast, and clarity. Over time, significant improvements have been made, but not without problems and expense.

The need to provide improved functionality in monitors has made state-of-the-art monitors complex devices, and in many instances the most expensive component of an overall computer system. For example, many monitors are provided with on-board, microprocessor-based controllers, including control routines for relatively complex operations like power management.

Conventional monitors typically have built-in control inputs for such things as brightness, contrast, picture position and sizing. These control inputs are typically rotary potentiometers, and may be mounted at different locations around the case of the monitor as determined by each manufacturer. They may be located on the front in plane with the display screen, on the side, in the back, or on top of the case, often behind a small panel a user may open to access the controls. Moreover, the controls for brightness and contrast may be located on a separate area of the case than positioning and sizing controls. Also, such controls may be digital or analog in design. There are few, if any, industry standards that dictate a user interface for such controls on monitors, and therefore there is a wide variety of locations and types of control input for such monitors.

in a cathode ray tube (CRT) monitor, the control inputs for contrast and brightness typically interact with video circuitry in the monitor, and modulate the signal by varying electrical potential to one or more control grids that effect the emissions from a cathode filament. The brightness control, for example, adjusts the level of the scanning electron beam, which in turn makes the on-screen images brighter or less bright. Contrast is the linear relationship between incoming video dot data signal strength and the current screen brightness.

Besides brightness and contrast control inputs, there are also typically control inputs for position and sizing, which allow a user to alter the position of the display on the screen to some extent, and to adjust the height and width of the display area on the screen.

The control inputs described above must be accessed under several different circumstances. For example, at different times of day, and at night, the ambient light conditions may vary, requiring an adjustment in brightness. Moreover, brightness and contrast are typically somewhat interactive, so when one is adjusted it is usually expedient to adjust the other.

Making control inputs as described requires a user to reach to the monitor, sometimes to different locations around its case, to find the proper control. Moreover, the control inputs do not show adjustment limits or the present position or percentage of input.

Another circumstance that requires adjustment of monitor controls is at the time a new monitor is installed in a computer system. It is not possible for a manufacturer to anticipate vagaries of individual systems, so when a new monitor is installed it is not unusual for the initial display on the monitor screen to be off-center, skewed, and the like. Adjustments have to be made as part of the setup procedures to provide an initial properly adjusted picture.

What is clearly needed is an easy, convenient method with suitable apparatus for adjusting display characteristics for a display monitor without having to access control input devices on the monitor. The new apparatus and method should provide for input at conventional input devices and transmit control settings and variances for adjusting display characteristics without requiring new apparatus at the host or in conventional connections between the host and the display.

SUMMARY OF THE INVENTION

According to embodiments of the invention, a general-purpose computer system having a CPU, a memory, input apparatus, a monitor with a CRT, and a video adapter for providing color, VSYNC, and HSYNC signals to the monitor is provided with a unique monitor control adjustment system. The monitor control adjustment system comprises an interactive display for correcting signals to the CRT in the monitor, and the interactive display comprises shapes programmed to appear rectangular and of specific size on a properly adjusted monitor. There is a cursor icon movable in the interactive display according to pointer movement, and dragging handles configured for associating pointer movement and cursor location with control routines executable on the host.

In one embodiment, the interactive display comprises an outer shape appearing rectangular on a properly adjusted monitor and having a first set of dragging handles at corners for adjusting the size of the display on the video monitor, an inner shape appearing rectangular on a properly adjusted monitor and having a second set of dragging handles for adjusting signals to the CRT for bowing and parallelism, and an inner dragging handle within the inner shape for adjusting the position of the display on the monitor.

In various embodiments of the invention, circuitry controllable by the CPU is provided for converting the user inputs to digital commands and data, for monitoring pulses of the VSYNC signal, and for placing serial data packets representing the digital commands and data on the line carrying the VSYNC pulses, between instances of the VSYNC pulses. At the monitor, a controller receives the serial data packets and performs adjustments to display characteristics in response to the digital commands and data.

The controller in the monitor receives all signals from the host computer, strips the serial command packets from the VSYNC line, and provides the signals less the serial packets to conventional CRT circuitry. The controller adjusts the signals in some instances, and provides separate output signals in other instances to responsive circuitry to make the adjustments to display characteristics.

In a preferred embodiment, the interactive display is configured to adjust display position, size, parallelism, and bowing characteristics, in alternative embodiments, adjustments may be made for brightness, contrast, aspect ratio, and for other characteristics. Commands may also be sent to switch video modes and to signal the monitor to assume alternative power-using states.

The system according to various embodiments of the invention provides hands-free, user-friendly adjustments by eliminating the need for confusing and cumbersome manual controls on high-resolution monitors, and also eliminates the expense of such manual controls. Wear in conventional mechanical apparatus to make CRT display adjustments is also eliminated. A further advantage is that the invention can be practiced by loading unique control routines into exiting computers without any addition of hardware, although a monitor configured according to the invention is required. The standard system video BIOS and video controller is used.

DESCRIPTION OF THE PREFERRED EMBODIMENTS

Figure 1:
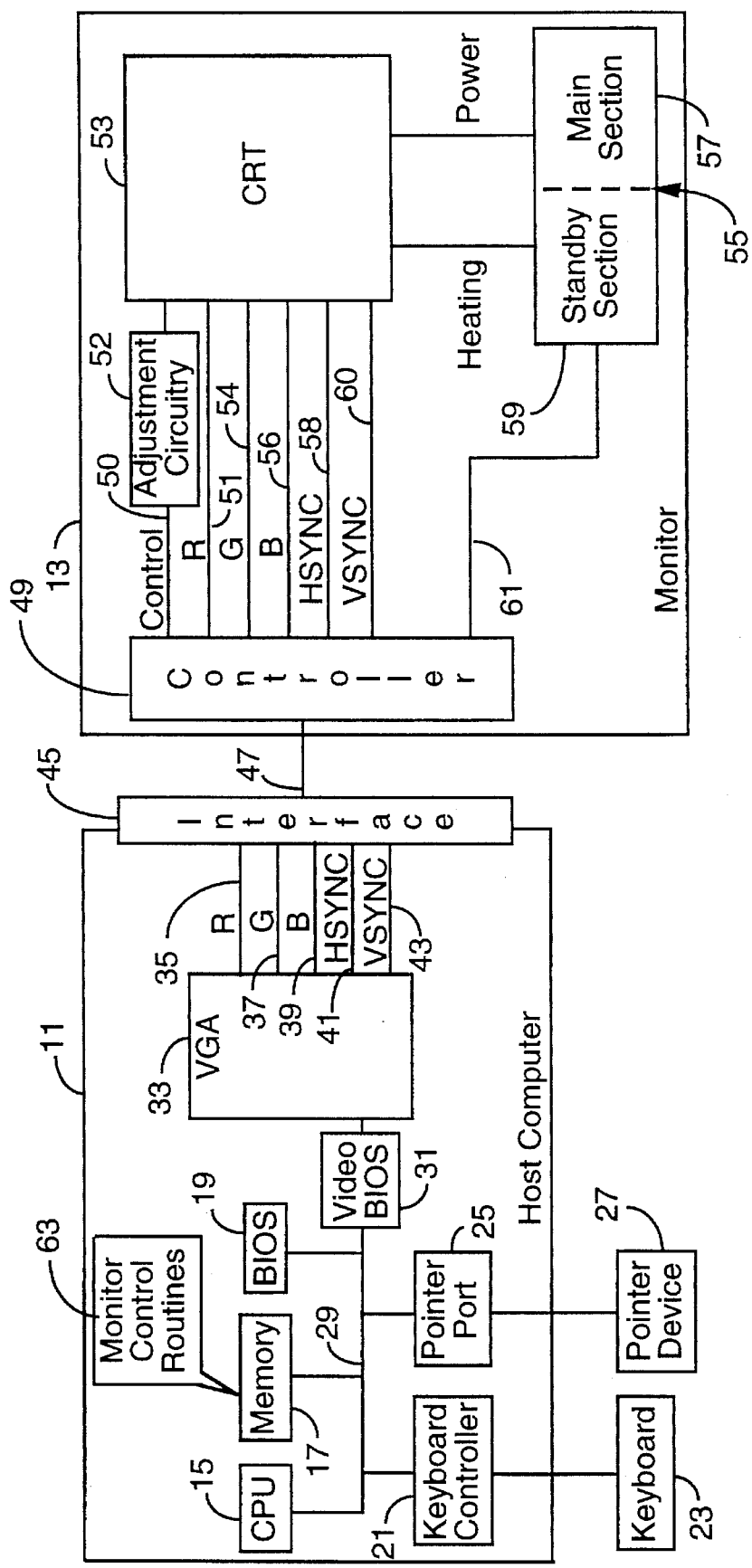
FIG. 1 is a block diagram of a host computer system connected to a CRT monitor, including remote control of display functions according to an embodiment of the present invention.

FIG. 1 is a simplified block diagram of a host computer system 11 connected to a CRT-type monitor 13, providing remote control of display functions according to an embodiment of the present invention. Host system 11 comprises a CPU 15 for managing computer functions, executing logic, and performing computations; a memory 17, typically a random-access memory (RAM), for storing control routines and data; a basic input-output system (BIOS) 19, a keyboard controller 21 coupled to a keyboard 23; and a pointer port 25 coupled to a pointer device 27, which may be a trackball or a mouse, among other types of pointer devices.

The elements described above are bus connected by one or more bus structures represented by interconnecting bus 29, which also connects to video circuitry 33 through a video BIOS 31.

It is well known in the art that there are many variations in the architecture shown for the host computer system of FIG. 1, and the architecture shown is meant to be representative of conventional architecture in general. There are similarly many alternatives for the particular functional elements shown. For example, in FIG. 1 a keyboard 23 is illustrated as an input device. There are alternatives for input devices, such a touch screens, pen-pads, and the like, and such alternatives may be used in other embodiments of the invention. There are similarly several alternatives for pointer devices.

In the embodiment described relative to FIG. 1, video circuitry 33 is a VGA sub-system, which provides video dot data for a monitor as R, G, and B signals 35, 37, and 39, and also horizontal synchronization (HSYNC) signals 41 and vertical synchronization (VSYNC) signals 43, to a cable interface 45. These signals and ground connections are carried to monitor 13 conventionally by a VGA cable 47 in this embodiment, wherein the signals are carried on separate conductors.

The means of transmitting signals to the monitor is not limiting to the invention, as there are several ways this is conventionally accomplished. Transmission in other embodiments might be by composite video signal, for example, transmitted on a serial-type connection, or a composite signal might even be broadcast.

in the embodiment represented by FIG. 1 the VGA signals are received at the monitor by a controller 49 configured according to the invention. Controller 49 may comprise any one of several suitable, commercially available microcontrollers or microprocessors, or it may be a proprietary unit manufactured specifically for the purpose of controlling a display according to embodiments of the present invention. In the former case, in addition to the commercially available unit, there may be circuitry driven by outputs of the commercial microcontroller to provide suitable output signals to drive the necessary conventional CRT circuitry in making adjustments and the like.

Controller 49 operates on incoming signals in a manner described more fully below, and provides adjusted R, G, and B signals, and adjusted HYSNC and VSYNC signals on lines 51, 54, 56, 58, and 60 to a conventional CRT 53.

Controller 49 also in this embodiment provides control signals on line 50 to adjustment circuitry 52 to provide control of characteristics of a display on CRT 53. In some embodiments this circuitry may be a part of controller 49.

Conventional CRT 53 in this embodiment is powered by a power supply 55 having a main section 57 and a standby section 59. A control connection 61 between controller 49 and power supply 55 allows the controller to shift the power supply from full power mode to a very low power standby mode, or to turn the power supply off altogether. In other embodiments there may be plural power modes controlled by controller 49 via link 61, including reduced filament heating power, heating power off with other circuits at full power, and other combinations.

Control commands and data intended for controller 49 to accomplish control and video adjustment functions in the monitor are initiated by a user at user input devices coupled to host computer 11, in conjunction with control routines 63 shown as stored in RAM 17.

Those with skill in the art will recognize that control routines according to embodiments of the invention may be provided to a host, stored, and accessed in a variety of ways.

There may be, for example, a terminate-and-stay-resident (TSR) program activated by a hot-key sequence. Alternatively a user may call a program from an operating system (DOS, UNIX, Windows, and the like). Control routines also may be resident on a mass storage device, although access time would be poor.

In the present invention, the mechanism for transmitting commands and data to controller 49 is by inserting a serial data pattern on the VSYNC line whenever there is a command and/or data to be sent, As is known in the art, the VSYNC signal is typically a pulse of short duration transmitted at a frequency that determines the frame rate for the display. For each instance of the VSYNC signal, a new scan of the display is initiated.

The period of the VSYNC signal varies depending on a number of factors, such as the clock rate of the computer system, the frequency of the monitor (if a CRT), and the resolution of the display. For the VGA system of FIG. 1 a typical VSYNC period is from 10 to 20 milliseconds.

Figure 2:
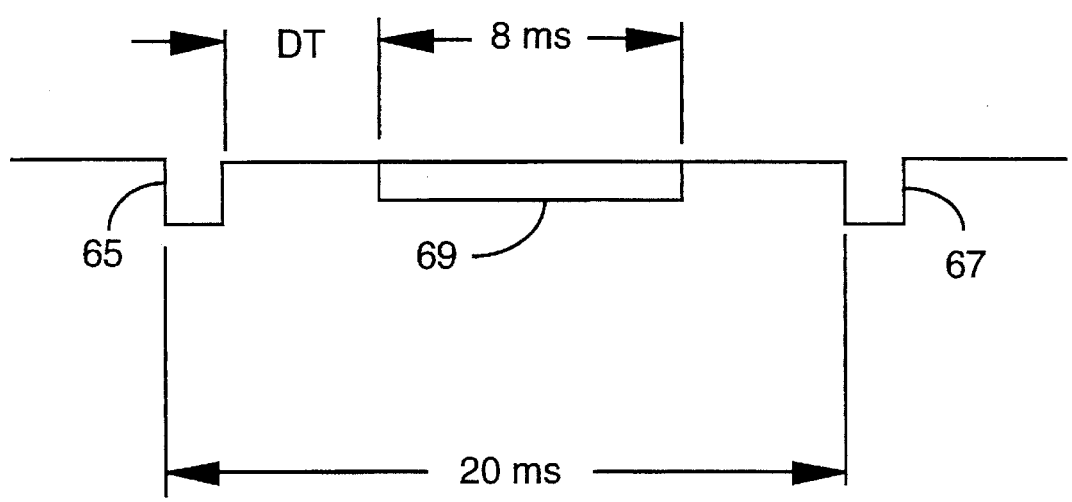
FIG. 2 is an illustration of signals on a VSYNC line in a connecting cable of FIG. 1.

FIG. 2 illustrates the VSYNC signal for the embodiment of FIG. 1, with a serial data packet inserted. Two VSYNC pulses 65 and 67 are shown at a period of 20 ms with a serial data packet 69 inserted having a total time of about 8 ms. The serial data pattern, although shown in FIG. 2 as a rectangular area, is a wave form over the 8 ms period transmitting a digital pattern in an analog fashion, as is known in the art. The same driver used for forming the VSYNC pulse is controlled to provide the serial data pattern.

In the embodiment of FIG. 1 the host system in combination with control routines 63 polls the vertical sync signal for every occurrence of the signal. Upon detecting the VSYNC signal, serial data pattern 69 is inserted on the VSYNC signal line at a set time DT (for delay time) after the instance of the VSYNC pulse. Depending on the period of the VSYNC signal, the delay time and the time duration of the serial data pattern inserted may be different than the times shown.

A serial pattern is inserted only if an input has been made by a user, and a digital command and/or data word is available in a ready register for transmission. For example, a user might desire to increase the brightness of the display. The user accesses an interface, which presents a display window with a scrolling element operable by a cursor controlled by a mouse. The system positions a token in the scrolling element indicating the current brightness setting in the adjustable range. The user may then drag the token as is known in the art with cursor control, to a new position in the scrolling field, indicating an increase in brightness.

In response to the user input, the host system prepares a command and data. The command is a digital value recognizable by controller 49 (FIG. 1) to increase brightness, and the data (which may be one or more digital values) indicates the amount of alteration to be made, or, alternatively, the new position in the total range to be assumed.

The host system, operating according to control routines 63, places the command and the data in a series of registers reserved for the purpose in memory. At the next polled VSYNC pulse, there being valid values in the reserved registers, the system, still following the dictates of routines 63, inserts the command on the VSYNC line. After the command is inserted, at following VSYNC pulses, the data is inserted. If there is more than one data word associated with the command, each is sent after following VSYNC pulses.

At monitor 13, controller 49 is configured to receive and recognize the commands and data inserted on the VSYNC line, and to act on the commands and data to accomplish the desired alteration in display characteristics. In the present example, the brightness adjustment command is received and stored, the data is similarly received, and the controller responds by adjusting the brightness of the display according to the data value or values received.

As was described in the background section above, the conventional adjustments for video displays, in particular CRT displays, are brightness, contrast, position, and size. In the embodiment of FIG. 1, there are command words insertable on the VSYNC line for all four of these conventional adjustments, and data input interfaces for magnitude of adjustment to be made as well. But these four characteristics do not exhaust the uses of the system of the invention.

Besides the four adjustments described above, embodiments of the invention are provided for managing power levels for the monitor and for switching video mode. In the first instance, one or more commands are available for power management, such as to place the monitor in a standby mode, or to turn it off altogether. In alternative embodiments there may be just one, or more than one standby mode. For example, there may be intermediate standby levels for providing partial power to the filament heater, controlling the extent of warmup time required for subsequent operation.

Another embodiment of the invention incorporates commands and data for switching video modes. In the VGA standard, for example, there can be 350, 400, or 480 lines per frame. Mode switches may also be made from a text application to a graphics application, to provide for higher resolution for graphics. By sending commands directly to the controller in the monitor, the monitor can synchronize immediately, avoiding annoying blanking or flashing on the display screen. The commands and data impressed on the VSYNC line do not affect transmission or reception of the VSYNC signal to any conventional monitor circuitry, to a noticeable degree.

Systems according to various embodiments of the invention replace conventional analog and digital fine tuning adjusters on monitors giving the user hands-free operation. The control system circuitry within the monitor may interface in the same areas and methods as convention digital or analog control adjusters but is not limited to those control parameters or areas. Through command/data inputs, an embodiment of the invention provides for small finite adjustments according to user preferences.

As described above, a user accesses the control routines in embodiments of the invention on the host 11, and the interface may take any one of several forms. There may be, for example, a pop-up menu with graphical interfaces; or there may be a command line syntax. The control routines may be activated by a hot-key as in a background driver, or by calling a stored program in the operating system such as Windows, DOS or UNIX. A topic-sensitive help menu may also be provided.

It will be apparent to those with skill in the art that it is possible to implement the invention in control routines written in a variety of ways, as it is well know in the art that individual programmers have individual preferences in choice of high level languages and programming techniques.

In the overall system configuration shown in FIG. 1, the host system differs from conventional systems in the combination with the control routines providing the functions described, and the user interface provided by the control routines on demand. The monitor differs from conventional monitors in controller 49, which is configured to monitor the VSYNC line and to receive and act upon command and data packets transmitted serially on the line between VSYNC pulses. In the first instance, routines may be added to conventional equipment by the simple expedient of loading software. In the case of the monitor, upgrades may be made by adding premanufactured components to existing monitors, and by manufacturing original equipment monitors according to the invention.

In yet another embodiment of the invention, commands and data are transmitted to change the intensity of video dot data to make small changes in image color tone.

In another alternative embodiment of the present invention additional computer-aided calibration of the CRT display is provided, in addition to brightness, contrast, and size adjustments, as was described above, conventional high-resolution monitors also have manual controls for calibration of the display to allow the user to correct for distorted images.

Figure 3:
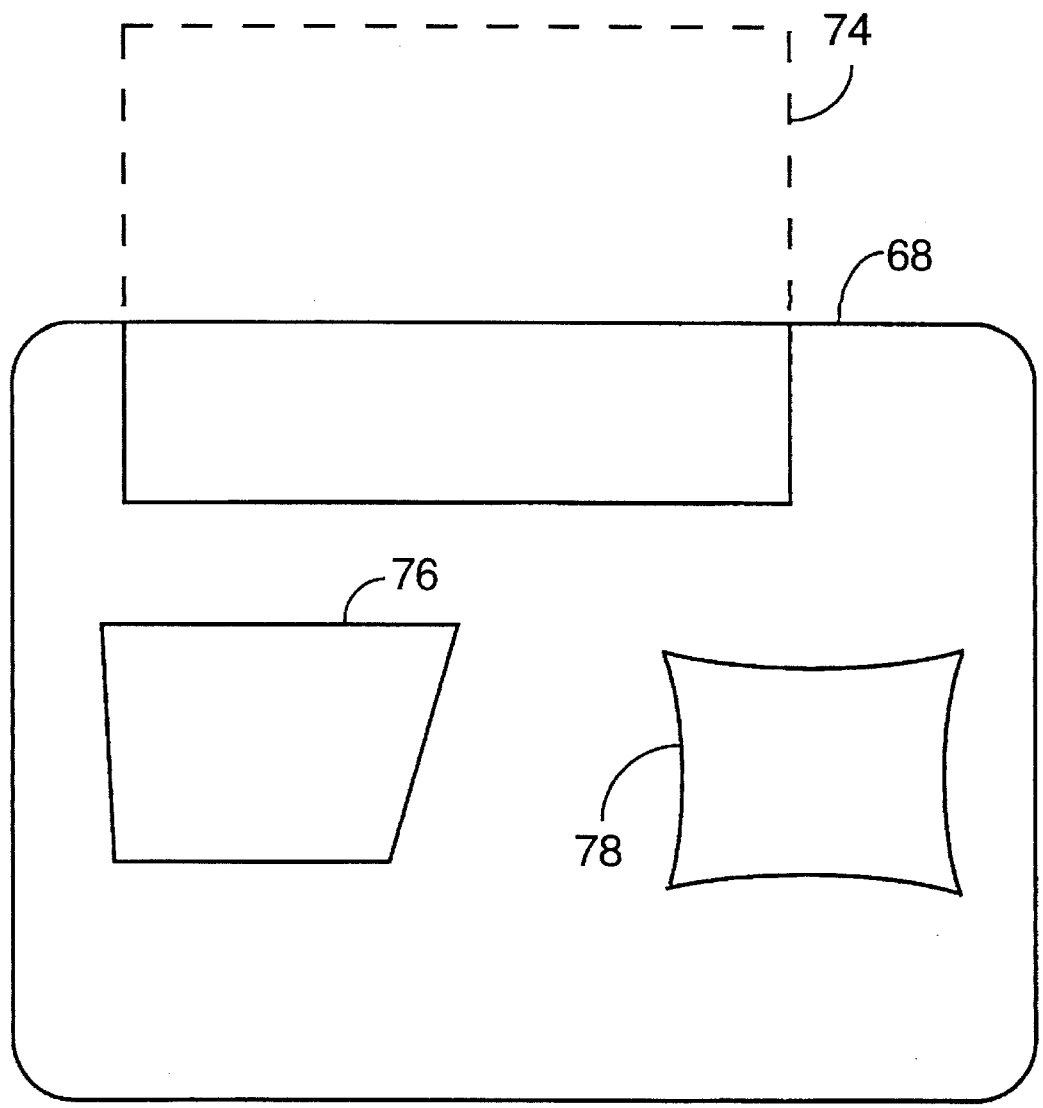
FIG. 3 illustrates examples of display anomalies that may be corrected by a system according to an embodiment of the present invention.

Examples of distorted images are shown in FIG. 3. In FIG. 3, border 68 represents the physical outer limit of the display area of monitor screen 72. Each of the three four-sided shapes 74, 76, and 78 is representative of an anomaly caused by a different maladjustment in display signals to the CRT. In each case, the shape, with proper adjustment, would be a rectangle centered on the screen with dimensions nearly that of the screen. In shape 74, the image is too small, as well as being centered off-screen; the image needs to be repositioned to the central screen area and enlarged to the correct size. Trapezoidal shape 76 represents a maladjustment wherein one edge is not vertical, and the image is undersized as well. In shape 78, bowed sides indicate nonlinearity needing to be corrected. The bulges are shown inward and only two sides are showed bowed, but outward bulging is also common, and all the edges may be affected.

Figure 4:
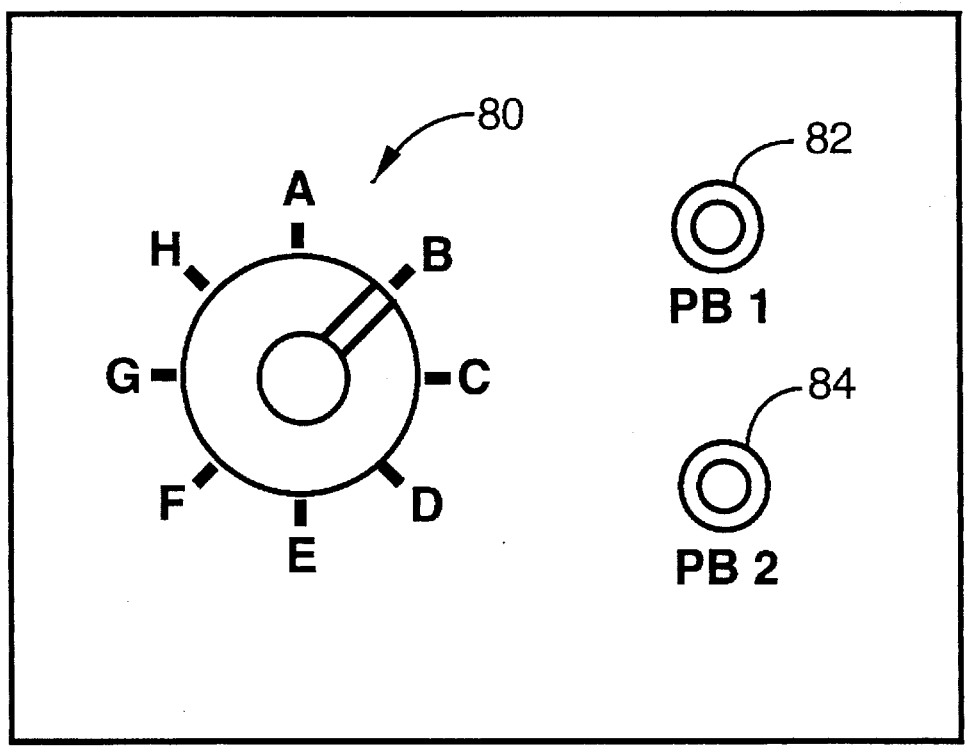
FIG. 4 illustrates a conventional control adjustment physical input apparatus for a CRT monitor.

The following characteristics relative to size, shape, and position are calibration adjustments needed for most distortions encountered:

1. Vertical position
2. Horizontal position
3. Vertical extent (height)
4. Horizontal extent (width)
5. Bulge (linearity)
6. Parallelism Conventional CRT monitors typically utilize a test/calibration switch panel recessed behind a removable cover or hinged door of the monitor housing. Such a panel contains adjustment controls and switches for an equipment operator to manually correct image distortions. FIG. 4 shows a typical control layout. A rotary selector switch 80 is for selecting function to be adjusted. Two pushbuttons 82 and 84 are for positive and negative adjustment. For example, rotary selector position A might be dedicated to vertical position adjustment. To adjust vertical position of the display, one would set the selector switch to position A and depress pushbutton switch 84 to move the display downward or pushbutton switch 82 to move the display upward. With switch 80 in position B the pushbutton switches would adjust the display position left and right.

Similarly, the remaining selector positions may represent adjustment functions as follows:

Pos C for display height

Pos D for display width

Pos E for top edge width

Pos F for left edge height

Pos G for vertical bowing

Pos H for horizontal bowing

FIG. 4 is merely representative of physical clusters that might be used for adjustment functions. Adjustments could also be achieved with other control arrangements, such as two banks of pushbutton switches arranged in pairs, each pair dedicated to a separate function.

Another arrangement could be a single bank of double throw toggle switches (with center position off), wherein each switch is dedicated to an adjustment function. In another arrangement, the toggle switches could be spring biased to center (off). It will be apparent to those with skill in the art that there are many other input arrangements that could perform the necessary functions.

In the alternative embodiment of the present invention described below, control commands and data are sent to the monitor from a host computer by placing transmitting serial digital values on the VSYNC line, just as described for other embodiments above. The commands and data are provided by control routines operable on the host computer and initiated by unique keyboard and pointer actions taken by an operator. An embedded microcontroller within the monitor receives the coded adjustment commands and data, and, using preprogrammed adjustment algorithms, adjusts appropriate analog control signals via digital to analog (d/a) converters interfaced to the display control inputs. With this invention, adjustment operations are reduced to familiar keyboard and pointer movements, and physical inputs as described relative to FIG. 4 are no longer needed.

Operator Procedure

In this embodiment of the invention, adjustment is initiated by depressing a unique key combination at a keyboard coupled to the computer to which the CRT to be adjusted is connected. The adjustment routines initiated provide an interactive display on the monitor which comprises three distinct functional control elements, each having on-screen icons, also called handles, interactive with a cursor manipulated by an operator through a pointer device, such as a mouse or a trackball.

Figure 5A:
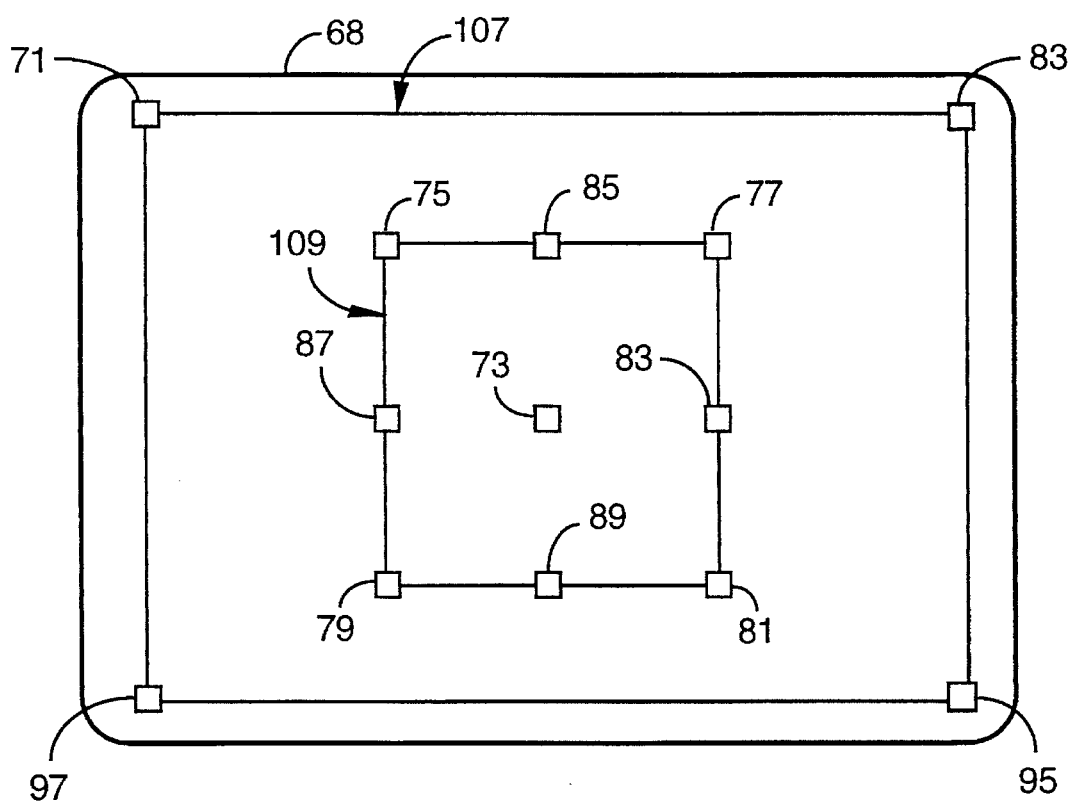
FIG. 5A shows an adjustment interactive display according to a preferred embodiment of the present invention.

FIG. 5A shows three control elements 107, 109, and 73, and a cursor 111, presented by the interactive display. Each element is a rectangle drawn with data stored on the host, representing properly sized and shaped dimensions for the particular monitor connected. Element 107 is for size adjustment, and in a fully calibrated display is congruent with the actual perimeter of the display, which becomes a reference standard for size adjustment. intermediate element 109 is for parallelism and bowing adjustments. Inner element 73, which is a handle only, is for position adjustment. In a fully calibrated display inner element 73 will be positioned in the center of the screen.

Figure 5B:
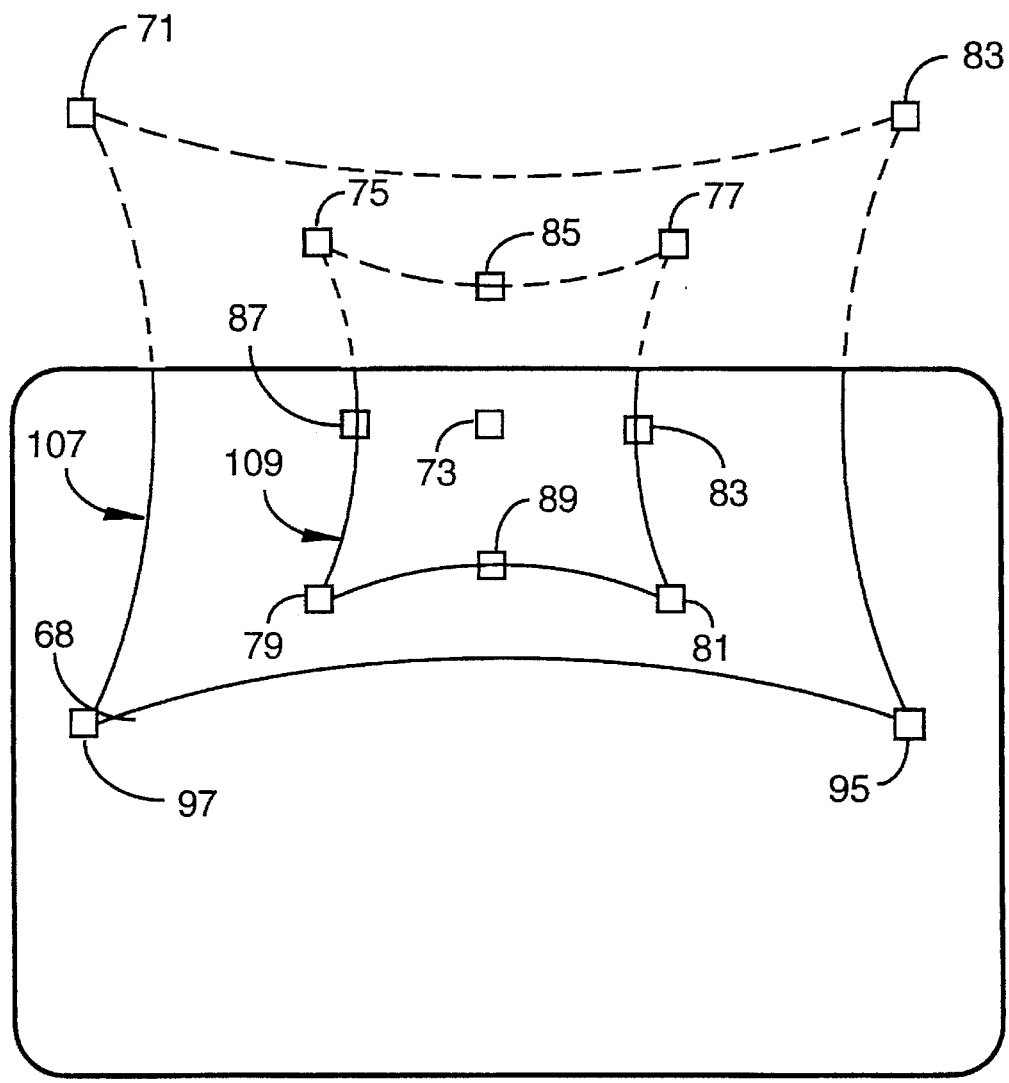
FIG. 5B shows the interactive display of FIG. 5A as seen on a maladjusted monitor in one example.

FIG. 5B is an illustration of the display of FIG. 5A with the monitor seriously maladjusted. The edges are bowed, the size is small, and the display is displaced upward on the monitor. This is but one example of an infinite variety of possible combinations of maladjustment, and shows one possibility that an operator would see when first viewing a display on a newly connected monitor. In this example, those parts of the on-screen interactive adjustment elements provided that are not on-screen are shown in dotted outline. These portions would not be seen by an operator.

Adjustment are made by an operator by what are well known in the art as click-and-drag procedures, wherein an operator moves on-screen cursor 111 to one of the handles of an adjustment element, then manipulates the pointer device while providing a drag signal, such as by holding a button on the pointing device depressed. In the description that follows, the term dragging refers to this well-known procedure.

Figure 5C:
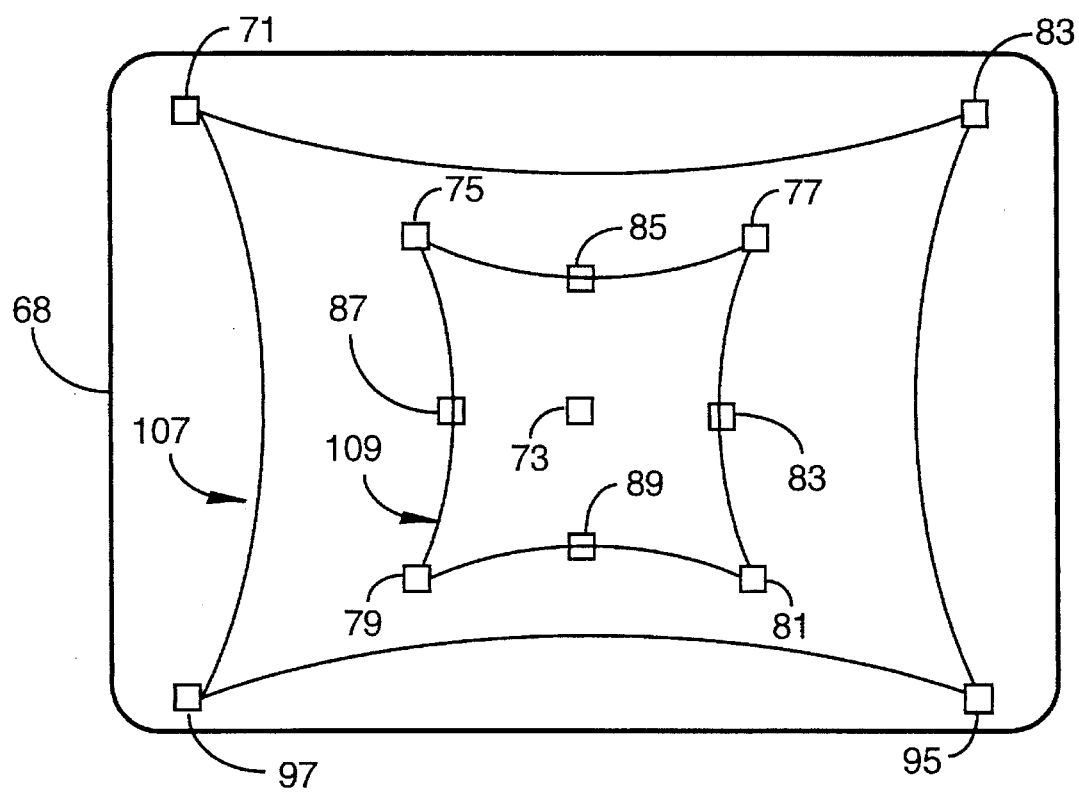
FIG. 5C shows the interactive display of FIG. 5B after position adjustment.

To bring the adjustment elements of a maladjusted display on screen, the operator moves cursor 111 to element 73, and drags the display on screen by moving handle element 73 to the approximate center of the display area. The result is shown in FIG. 5C. Typically, if the display is initially off-center, centering will be the first adjustment to be made.

For correcting parallelism maladjustment bowing, dragging adjustments are made to corner handles 75, 77, 79, and 81 of intermediate element 109. For example, dragging corner handle 77 to the right increases the width of the top edge of the display relative to the bottom by extending the top edge to the right. Similarly, dragging corner 77 upward increases the length of the right edge relative to the left and dragging it downward decreases the length of the right edge relative to the left. Similar adjustments can be made at the other three corners.

Figure 5D:
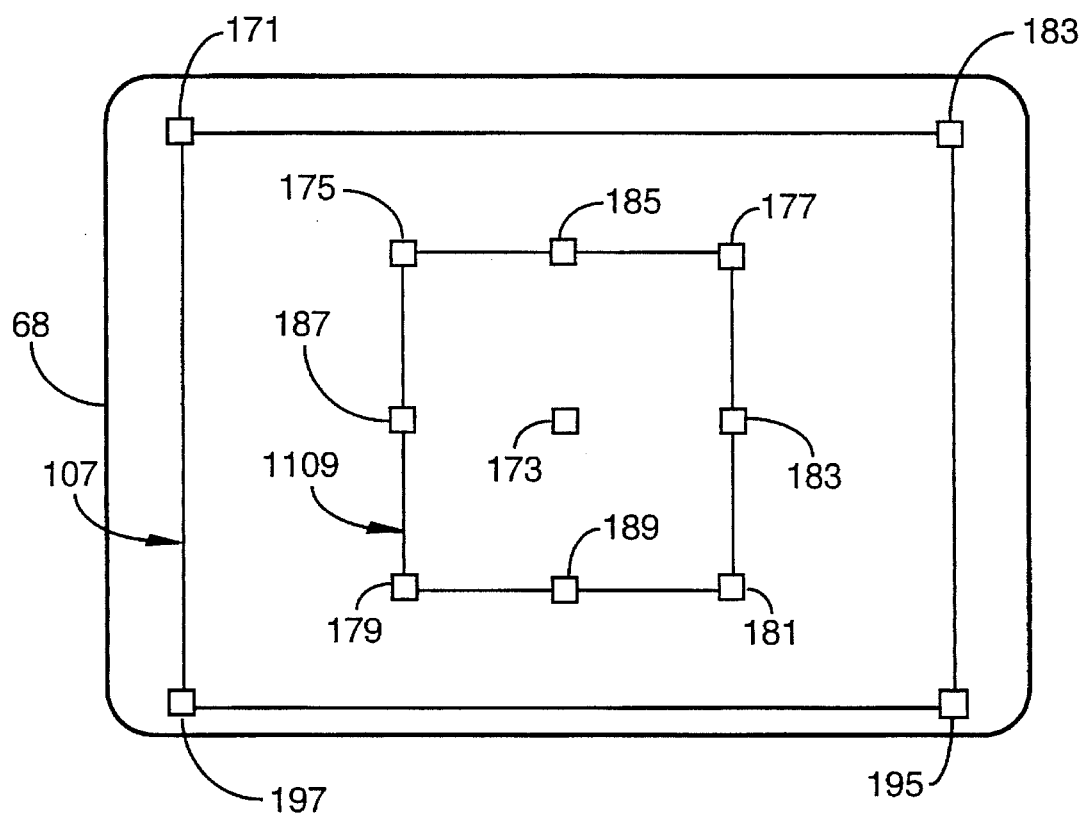
FIG. 5D shows the interactive display of FIG. 5C after correction for bowing and parallelism.

For correcting bowing, edge handles 83, 85, 87, and 89 of intermediate element 109 may be manipulated. The bowing shown in FIG. 5C, for example, is corrected by dragging handle 85 upward, handle 89 downward, handle 87 to the left, and handle 83 to the right, until the edges are straight. FIG. 5D shows the result of these operations.

Figure 5E:
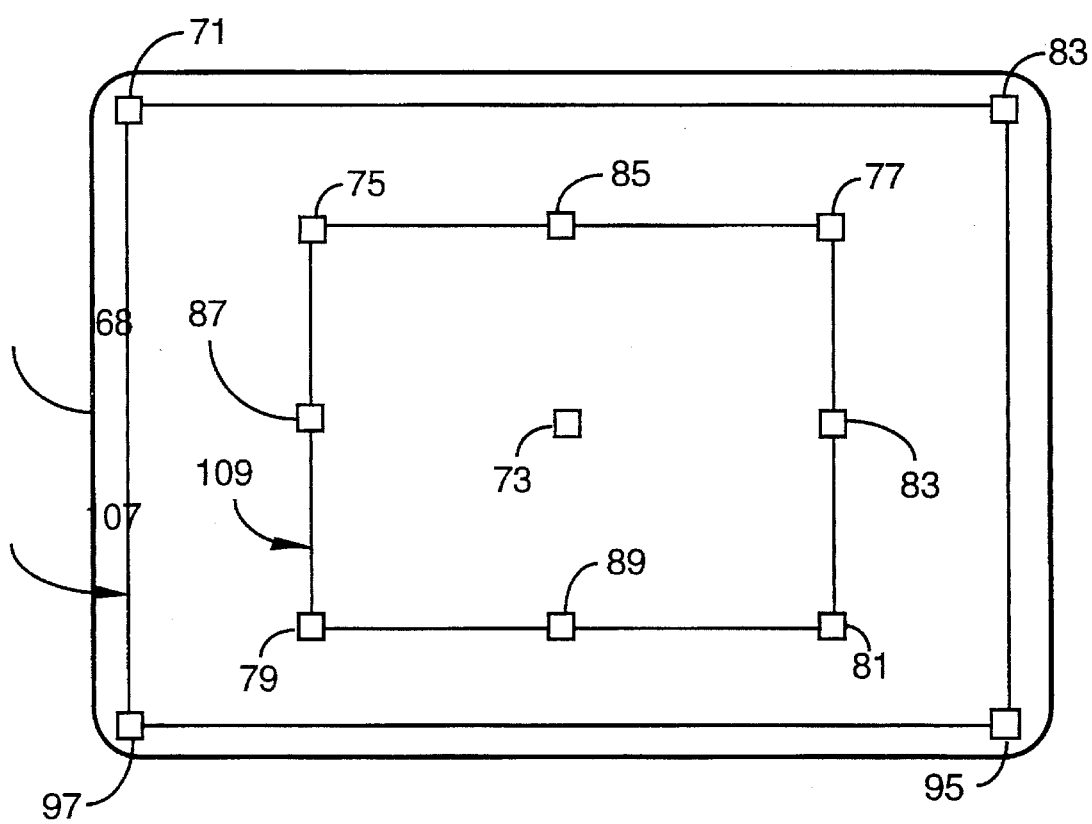
FIG. 5E shows the interactive display of FIG. 5D after correction for size.

At this point the display is centered, and the edges are straight and parallel (rectangular display), but the size is still smaller than the display area. To correct the size, one drags handles 71, 83, 95, and 97 to near the corners of the display area. The result of this operation is shown in FIG. 5E, and the adjustment is complete.

It will be apparent to those with skill in the art that the apparent size could be too large as well as too small before the size adjustment is made with the handles of element 107. If this is so, at least part of element 107, and some, if not all, of the handles of that element, will be off screen, even after the display is centered. In this circumstance, one may bring handles on screen by dragging element 73, make coarse adjustment to bring all elements on screen, then recenter the display. After image adjustments have been made it is only necessary to leave the adjustment application on the host, discontinuing the display of the unique adjustment elements described above. Readjustment may be needed at some future time due to deterioration of hardware components or temperature effects, for example.

The embodiment depicted by FIGS. 3–5E makes use of existing host computer system hardware components (except the monitor display) by executing adjustment control routines loaded on the host computer. The control routines may be a part of the system BIOS, a TSR program that may be called by a user, or may be provided in one of many other ways known in the art.

The embodiment of the invention described with reference to FIGS. 3–5E operates via the hardware described relative to FIG. 1 above.

Control routines according to embodiments of the invention may be, as described above, a part of BIOS 19 (FIG. 1), may be stored in RAM 17, or may even stored on and operated from a peripheral storage device not shown, such as a plug-in flash card or other modular expansion peripheral, in some embodiments, the control routines are loaded as a part of the boot-up process as a TSR program, with access to operation provided by, for example, a hot-key sequence as is known in the art. Alternatively, the control routines may be loaded and accessed in another fashion, such as by menu or icon selection from an operating system, or by executing a batch program from DOS or other operating system.

The control routines operate by pointer position and pointer switch operation in ways that are familiar to those with skill in the art. Subroutines are called, and commands and data prepared for transfer, according to pointer operations, and as commands and data are provided, they are inserted on the VSYNC line as described above.

Controller circuitry 49 within monitor 13 receives the commands and data, and suitably biases and adjusts signals to CRT tube 53 within the monitor by means of adjustment circuitry 52.

Values associated with the correction data received by the controller are stored in non-volatile registers either within the controller or in the host system, so the proper adjustment of incoming signals to the monitor is automatic each time the monitor is turned on after the settings have once been made.

In the embodiment thus far described, the adjustments are made by a microcontroller. There are other implementations of control circuitry in the monitor which may be used, however. For example, application-specific circuits may be provided responsive to commands and data on the VSYNC line to provide specific outputs to perform the necessary biasing and adjustment.

In host computer 11, merging of the adjustment commands and data with the vertical timing signal is done within VGA controller 33, under the control of CPU 15. Using control routine algorithms, CPU 15, after detecting the vertical sync signal, inserts a delay time followed by the serial data for CRT control. Several frames of VSYNC may be used to transfer all needed control and data transmissions, depending on the adjustment being performed.

It will be apparent to those with skill in the art that there are many changes that might be made in details of the embodiments described without departing from the spirit and scope of the invention. Some of these alternatives have already been described, such as adjustment of various display functions, switching display modes, and adjusting the color tone of a displayed image. The system according to embodiments of the invention can switch directly between multiscanning oscillators within the monitor without interruption of the monitor's circuitry. Typically monitors detect interruptions before switching between oscillators with a slight intrinsic delay that blanks or flashes the screen.

In other embodiments of the present invention the command/data transmissions on the VSYNC line may be incorporated in other signal devices for alternative hands-free adjustment. The inclusion of a serial data pattern may be used to maximize any digital signal by using the blanking portion to benefit other performance parameters. Another embodiment of the invention may adjust an audio portion of a monitor that incorporates sound. Also, an additional embodiment invention may be provided to give an inexpensive digital monitor the ability to produce more colors by combining adjusted levels of R, G, B and Intensity. In another embodiment of the invention, the commands can fine tune monitor performance in areas of sharpness, color pixel separation, deflector alignment, and color convergence. Another embodiment incorporates command/data signals on the horizontal sync line between instances of the horizontal sync pulses.

In the embodiments wherein interactive display elements are provided with handles for pointer manipulation to determine adjustment commands and data magnitude for adjustment, there are other locations for handles, and other arrangements for interactive elements that are equivalent to those described, and fall within the spirit and scope of the invention. For example, only one shape that appears rectangular on a properly adjusted monitor is required, as a single such shape will demonstrate all of the anomalies describes relative to maladjustment, such as size, position, parallelism, and bowing. Interactive dragging handles may be associated with the single shape, provided there are handles associating pointer movement with all of the described anomalies i.e. bowing, location, parallelism, and size. A single such handle could be provided with selective ability for associating the handle with each of the anomalies needing correction.

What is claimed is:

1. An interactive display for correcting signals to a CRT in a video monitor, comprising:

shapes programmed to appear rectangular and of specific size on a properly adjusted monitor, for illustrating the nature and magnitude of adjustment needed for the monitor;

a cursor icon movable in the interactive display according to pointer movement; and dragging handles configured for associating pointer movement and cursor location with control routines executable on a host computer, for providing corrective information to the video monitor in response to cursor position and direction and magnitude of pointer movement.

2. An interactive display as in claim 1 comprising an outer shape appearing rectangular on a properly adjusted monitor and having a first set of dragging handles at corners for adjusting the size of the display on the video monitor, an inner shape appearing rectangular on a properly adjusted monitor and having a second set of dragging handles for adjusting signals to the CRT for bowing and parallelism, and an inner dragging handle within the inner shade for adjusting the position of the display on the monitor.

3. An interactive display as in claim 2 wherein the second set of dragging handles comprises dragging handles along sides of the inner shape.

4. An interactive system for adjusting signals to a CRT in a video monitor from a host computer coupled to the monitor, comprising:

an interactive display comprising shapes appearing rectangular on a properly adjusted monitor and a cursor movable in response to pointer movement;

dragging handles in the interactive display associated with the shapes;

control routines executable by the host computer configured to provide signals to the monitor according to cursor position and pointer movement.

5. An interactive system as in claim 4 wherein the shapes appearing rectangular on a properly adjusted monitor comprise an outer shape appearing rectangular on a properly adjusted monitor and having a first set of dragging handles at corners for adjusting the size of the display on the video monitor, and an inner shape appearing rectangular on a properly adjusted monitor and having a second set of dragging handles for adjusting signals to the CRT for bowing and parallelism, and the interactive display further comprises an inner dragging handle within the inner shape for adjusting the position of the display on the monitor.

6. An interactive system as in claim 5 wherein the second set of dragging handles comprises dragging handles along sides of the inner shape.

7. An interactive system as in claim 5 wherein the host computer comprises video adapter circuitry configured for supplying video and synchronization signals to the monitor over conductors in a connecting cable, and wherein adjustment signals are placed in serial packets on one of the conductors in the connecting cable.

8. An interactive system as in claim 7 wherein the video adapter circuitry is configured as Video Graphics Adapter™ (VGA) circuitry and the connecting cable is a VGA compatible cable.

9. An interactive system as in claim 7 further comprising a controller in the monitor configured for receiving the adjustment signals and operating adjustment circuitry to the CRT in response to the adjustment signals.

10. In a general-purpose computer system having a CPU, a memory, input apparatus, a video monitor, and a video adapter for providing color, VSYNC, and HSYNC signals to the monitor over a multi-conductor cable, a monitor control adjustment system comprising:

an input interface including a pointer device;

circuitry controllable by the CPU for converting the user inputs to digital commands and data, for monitoring pulses of time VSYNC signal, and for placing serial data packets representing the digital commands and data on the line carrying the VSYNC pulses, between instances of the VSYNC pulses; and a controller in the monitor for receiving the serial data packets and performing adjustments in the monitor in response to the digital commands and data;

wherein the monitor control adjustment system further comprises an interactive display provided according to prestored data in the computer memory, the interactive display having shapes programmed to appear rectangular and of specific size on a properly adjusted monitor, for illustrating the nature and magnitude of adjustment needed for the monitor, a cursor icon movable in the interactive display according to pointer movement, and dragging handles configured for associating pointer movement and cursor location with a control routine executable on a host computer, for providing corrective information to the video monitor in response to cursor position and direction and magnitude of pointer movement.

11. A monitor control adjustment system as in claim 10 comprising an outer shape appearing rectangular on a properly adjusted monitor and having a first set of dragging handles at corners for adjusting the size of the display on the video monitor, an inner shape appearing rectangular on a properly adjusted monitor and having a second set of dragging handles for adjusting signals to the CRT for bowing and parallelism, and an inner dragging handle within the inner shape for adjusting the position of the display on the monitor.

12. A monitor control adjustment system as in claim 11 wherein the second set of dragging handles comprises dragging handles along sides of the inner shape.

13. A monitor control adjustment system as in claim 10 wherein the video adapter circuitry is configured as Video Graphics Adapter™ (VGA) circuitry and the connecting cable is a VGA compatible cable.

14. A method for adjusting signals to a CRT in a video monitor, comprising steps of:

(a) providing an interactive display comprising shapes stored in memory in a host computer on the CRT screen of the video monitor, the shapes programmed to appear rectangular and of specific size on a properly adjusted monitor;

(b) providing a cursor icon in the display, the cursor icon movable in the display according to movement of a pointer device attached to the host computer;

(c) manipulating dragging handles associated in the display with the shapes;

(d) producing digital data in the host computer relative to movement of the pointer device used to manipulate the dragging handles;

(e) transmitting the digital data to the monitor;

(f) adjusting signals to the CRT in the monitor relative to the digital data transmitted to the monitor.

15. The method of claim 14 wherein, in the step for providing an interactive display comprising shapes, the interactive display comprises an outer shape appearing rectangular on a properly adjusted monitor and having a first set of dragging handles at corners for adjusting the size of the display on the video monitor, an inner shape appearing rectangular on a properly adjusted monitor and having a second set of dragging handles for adjusting signals to the CRT for bowing and parallelism, and an inner dragging handle within the inner shape for adjusting the position of the display on the monitor.

16. The method of claim 15 wherein the manipulating dragging handles step comprises dragging a central handle to position the display relative to edges of the screen, dragging handles of an inner shape appearing rectangular on a properly adjusted monitor and surrounding the central dragging handle to correct bowing and parallelism, and dragging corner handles of an outer shape appearing rectangular on a properly adjusted monitor to size the display relative to the screen.

* * * * *